Figure 1:
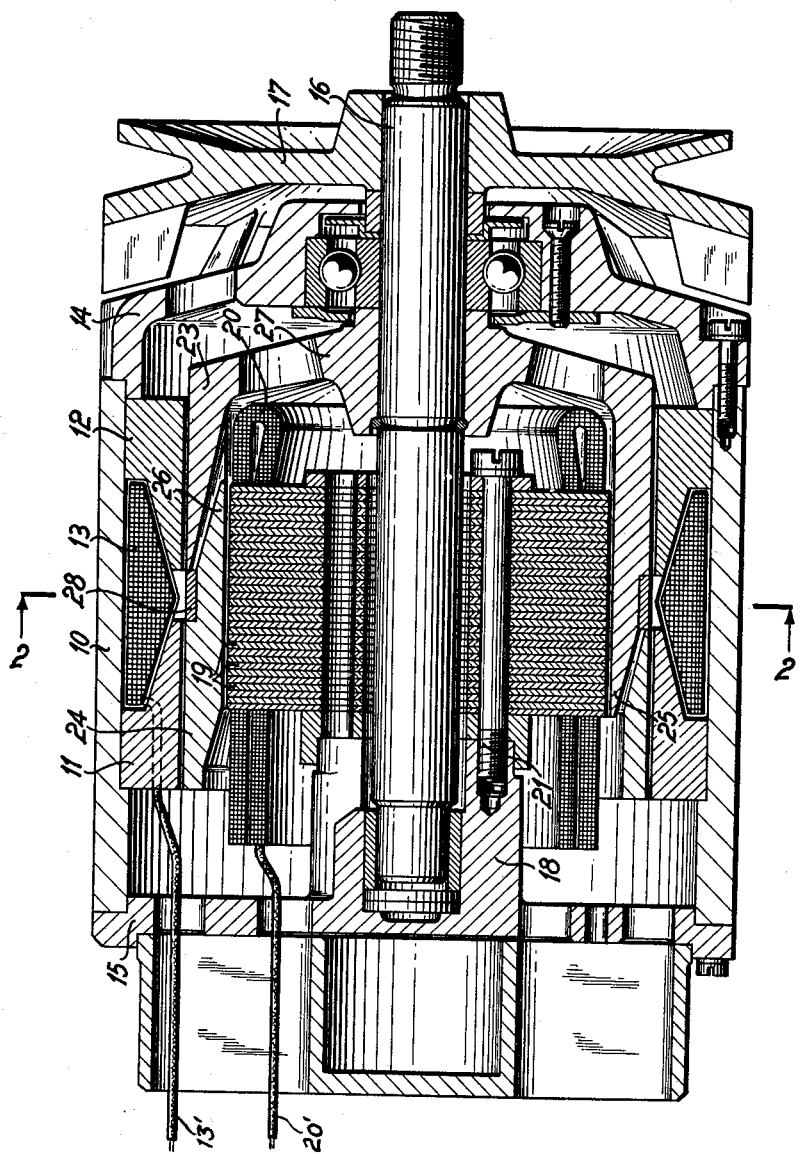

May 19, 1964

R. BOSCH 3,134,039

INDUCTOR-TYPE ALTERNATING CURRENT GENERATOR

Filed July 11, 1960

2 Sheets-Sheet 1

INVENTOR
Robert Bosch
by:
Michael S. Striker
Attorney

May 19, 1964 R. BOSCH 3,134,039
INDUCTOR-TYPE ALTERNATING CURRENT GENERATOR
Filed July 11, 1960 2 Sheets-Sheet 2

INVENTOR
Robert Bosch
by: Michael S. Striker
Attorney

United States Patent Office

3,134,039
Patented May 19, 1964

3,134,039
INDUCTOR-TYPE ALTERNATING CURRENT GENERATOR
Robert Bosch, Schlossberg, Gerlingen, Germany, assignor to Robert Bosch G.m.b.H., Stuttgart, Germany
Filed July 11, 1960, Ser. No. 42,109
Claims priority, application Germany July 11, 1959
1 Claim. (Cl. 310—168)

The present invention concerns an alternating current generator particularly useful for the generation of electric power on vehicles, and more particularly to a generator of the inductor-type in which both the armature assembly and the exciter field assembly are mounted stationarily one surrounding the other while a rotary yoke member having yoke members projecting into a gap between the armature assembly and the field assembly serves to periodically vary the magnetic flux set up by the magnetic field in the armature so as to cause generation of an output current therein depending on these flux variations.

In known alternating current generators of this type, an armature is provided which is composed of annular sheet metal laminations which are provided at their inner circumference with notches forming slots for accommodating the armature winding. This armature surrounds the rotary yoke member and is stationarily supported in the generator housing, while a stationary field assembly is arranged centrally within the rotary yoke member and surrounded by the latter. It has been found that this conventional arrangement is unsatisfactory in many respects and also comparatively costly. This is due to the fact that in such an arrangement the armature necessarily has comparatively large inner and outer diameters so that its structure requires comparatively large amounts of sheet metal and copper and that in this case the material of the housing cannot be utilized for carrying the alternating flux passing through the armature. In addition, it is comparatively much more difficult to apply the armature winding to an armature having the respective slots in the inner circumference thereof, as compared with an armature having the slots for accommodating the armature winding on its outer circumference. Also, it is to be noted that the iron losses in an armature of the conventional type are comparatively large because such an armature comprises a relatively large mass of iron.

It is therefore a main object of this invention to provide a generator of the type set forth but avoiding all the drawbacks mentioned above.

It is another object of this invention to provide a generator of this type the production cost of which is greatly reduced as compared with the cost of conventional generators of this type.

With above objects in view an inductor-type alternating current generator according to the invention comprises, in combination, centrally located stationary armature means for generating an output current; rotary yoke means arranged outwardly of said armature means adjacent thereto; stationary field means arranged outwardly of said yoke means and surrounding the same, said field means establishing, upon introduction of an exciter current thereinto, a magnetic field extending across the path of said rotary yoke means into said armature means, the rotation of said rotary yoke means causing variations of the magnetic flux set up by said magnetic field in said armature means so as to cause generation of said output current therein depending on said flux variations; and means for rotating said rotary yoke means.

Figure 2:
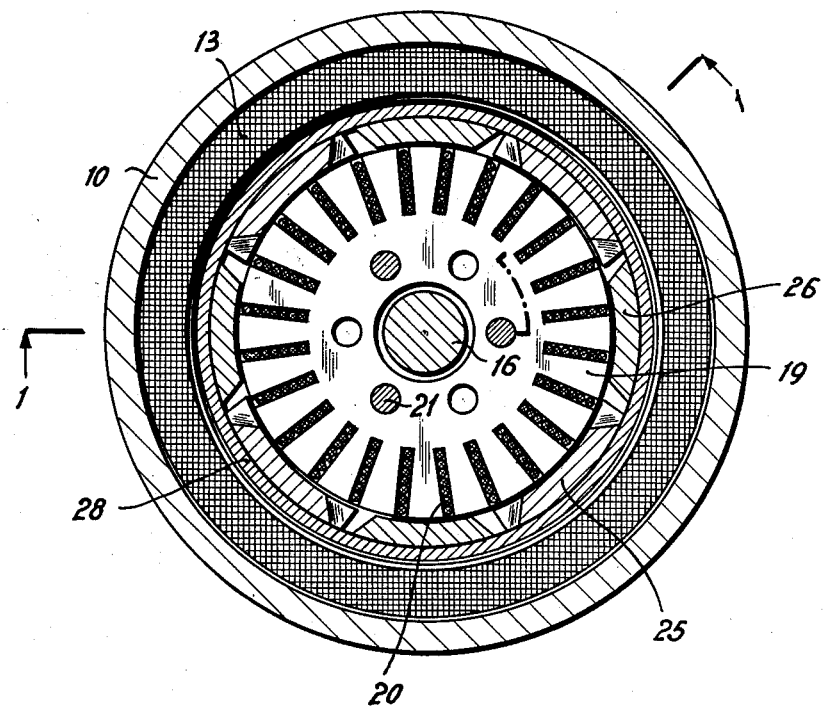

The novel features which are considered as characteristic for the invention are set forth in particular in the appended claim. The invention itself, however, both as to its construction and its method of operation, together with additional objects and advantages thereof, will be best understood from the following description of specific embodiments when read in connection with the accompanying drawings, in which:

FIG. 1 is a diagrammatic sectional elevation of an embodiment of the invention, the section being taken along line 1—1 of FIG. 2, and FIG. 2 is a transverse cross section of the embodiment of FIG. 1, the section being taken along line 2—2 of FIG. 1.

Referring to the drawings, the generator illustrated therein has a substantially cylindrical housing 10 which is substantially closed at both ends by end shields 14 and 15. Arranged in each one of the shields 14 and 15 are conventional bearing means supporting a rotatable shaft 16 which carries at its outwardly projecting end a drive sheave or pulley 17 which serves to impart rotation to the shaft 16.

The exciter field assembly comprises two iron yoke rings 11 and 12 which are mounted inside the housing 10 with tight contact with the inner surface of the housing wall 10. The yoke rings 11 and 12 are axially spaced from each other and are shaped, as can be seen from FIG. 1, so as to define between them and the inside surface of the housing wall 10 an annular space of substantially triangular cross section. A field winding 13 for exciting the generator is mounted within the above mentioned annular space and is supplied with exciter current through input lines represented diagrammatically by the line 13'.

The armature assembly arranged centrally and concentrically with the shaft 16 comprises a stack of sheet metal laminations 19, slotted along its outer circumference for accommodating the armature winding 20 and held together by screws 21. The stack 19 is held in central position by the screws 21 on an inwardly projecting boss 18 of the end shield 15. The output current induced in the armature winding 20 is delivered through output lines diagrammatically represented by the line 20'.

As can be seen, a substantial annular air gap is provided between the outer circumference of the armature stack 19 and the inner circumference of the field assembly, i.e., the inner circumferences of the yoke rings 11 and 12.

A rotary yoke member is carried by the shaft 16 for being rotated thereby. The rotary yoke member is essentially cup-shaped and is composed of a disc portion 27 rigidly attached to the shaft 16 and of two annular portions 23 and 24. The yoke member is made of iron. The annular portion 23 may be formed as an extension of the disc member 27 and extends into the above mentioned air gap between the field and armature assemblies. The second annular portion 24 is substantially cylindrical and constitutes an extension of the annular member 23 within the above mentioned air gap. The annular members 23 and 24 are rigidly connected with each other by means of a connecting ring 28 made of non-magnetizable material, and 24 are rigidly connected with each other by means of as the portion 24 with press-fit. Each of the portions 23 and 24 is provided with tapered prongs which extend in axial direction from one of these portions toward the other. On each of the portions 23 and 24 the projecting prongs 25 and 26, respectively, are circumferentially spaced from each other in such a manner that the projecting prongs 25 project into the intervals between the projecting prongs 26. The number and spacing of these prongs is determined according to the pole distribution of the armature.

It will be readily understood that when an exciter current is introduced into the field winding 13 a magnetic field is established which extends across the path of the rotary yoke member into the armature stack 19. The iron rings 11 and 12 serve to concentrate and to direct the lines of magnetic force in that direction. The magnetic flux is periodically varied by the rotation of the portions 23 and 24, and specifically by the prongs 25, 26 in such a manner that an alternating current is generated in the armature winding 20 in the manner known to the art.

It can be seen that the iron housing wall 10 contributes to rendering the magnetic circuit of the field system particularly effective. Moreover, it has been found that the above described shape of the iron yoke rings 11 and 12 and the resulting triangular cross section of the exciter winding 13 is particularly effective and economical.

It will be understood that each of the elements described above, or two or more together, may also find a useful application in other types of an inductor-type alternating current generator differing from the types described above.

While the invention has been illustrated and described as embodied in an inductor-type alternating current generator with stationary field and armature assemblies, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

An inductor-type alternating current generator, comprising, in combination, a housing having a substantially cylindrical wall portion made of ferromagnetic material; drive shaft means rotatably supported in said housing; field means concentrically surrounding said shaft means and stationarily supported in said housing within said cylindrical wall portion thereof, said field means including field coil means capable of carrying exciter current for establishing a magnetic field, and field yoke means adjacent to said field coil means for concentrating and directing said magnetic field, said field yoke means comprising two annular members made of ferromagnetic material having an outer circumferential surface in contact with the inner surface of said cylindrical wall portion and being spaced from each other axially and shaped to define between themselves and said wall portion an annular space of substantially triangular cross-section for accommodating therein said field coil means; centrally located armature means stationarily supported in said housing in a position to surround concentrically said shaft means and being surrounded by said field means with a substantial air gap spacing the outer surface of said armature means from the inner surface of said annular members of said field yoke means, said armature means including armature coil means for carrying an output current induced therein by said magnetic field; rotary yoke means carried by said shaft means for being rotated thereby and including circumferentially spaced yoke elements made of ferromagnetic material and extending axially into said air gap, for generating said output current by periodically varying, during its rotation, the magnetic flux between said field and armature means; input means for introducing an exciter current into said field coil means; and output means for delivering said output current from said armature coil means.

References Cited in the file of this patent
UNITED STATES PATENTS

| | | |
|---|---|---|
| 2,547,599 | Roters | Apr. 3, 1951 |
| 2,583,180 | Kronmiller et al. | Jan. 22, 1952 |
| 2,928,963 | Bertsche et al. | Mar. 15, 1960 |